United States Patent [19]

Butts, Jr. et al.

[11] Patent Number: 4,893,235
[45] Date of Patent: Jan. 9, 1990

[54] CENTRAL PROCESSING UNIT FOR A DIGITAL COMPUTER

[75] Inventors: H. Bruce Butts, Jr., Seattle; David N. Cutler, Mercer Island; Peter C. Schnorr, Redmond; Robert T. Short, Woodinville, all of Wash.

[73] Assignee: Digital Equipment Corporation, Maynard, Mass.

[21] Appl. No.: 208,844

[22] Filed: Jun. 16, 1988

Related U.S. Application Data

[60] Continuation of Ser. No. 782,092, Sep. 30, 1985, abandoned, Division of Ser. No. 538,373, Oct. 3, 1983, Pat. No. 4,586,130.

[51] Int. Cl.[4] ............................................. G06F 9/34
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,739,352 | 6/1973 | Packard | 364/200 |
| 3,969,724 | 7/1976 | Anderson et al. | 364/200 |
| 4,210,960 | 7/1980 | Borgerson et al. | 364/200 |
| 4,293,907 | 10/1981 | Huang et al. | 364/200 |
| 4,347,566 | 8/1982 | Koda et al. | |
| 4,352,157 | 9/1982 | Namimoto et al. | 364/200 |
| 4,370,709 | 1/1983 | Fosdick | 364/200 |
| 4,418,383 | 11/1983 | Doyle et al. | 364/200 |
| 4,488,224 | 12/1984 | Ippolito et al. | 364/200 |
| 4,542,476 | 9/1985 | Nagafuji | 364/749 |

FOREIGN PATENT DOCUMENTS

| | | |
|---|---|---|
| 766407 | 8/1967 | Canada . |
| 962781 | 2/1975 | Canada . |
| 0067667 | 6/1981 | European Pat. Off. . |
| 0080901 | 6/1983 | European Pat. Off. . |
| 51-78175 | 7/1976 | Japan . |
| 55-78343 | 6/1980 | Japan . |
| 57-5153 | 1/1982 | Japan . |

*Primary Examiner*—Gary V. Harkcom
*Assistant Examiner*—Christopher H. Lynt
*Attorney, Agent, or Firm*—Arnold, White & Durkee

[57] ABSTRACT

A central processing unit for a digital computer. In one embodiment, the central processing unit comprises a plurality of pointer registers that may be used during instruction execution to directly address other registers. In a second embodiment, the central processing unit comprises a size register that is loaded during the decode of an operation code with a size code indicating the data path width for that operation code. During instruction execution, the size code may be used at various times to determine data path width.

5 Claims, 6 Drawing Sheets

| Branch Type | Jump Condition | Source of Next Microaddress (bits 12–0) | | | | | Microstack Push |
|---|---|---|---|---|---|---|---|
| | | 12 | 11 10 9 8 | 7 6 5 4 | 3 2 | 1 0 | |
| JUMP | | JUMP REGISTER | | | | | |
| JUMP TO SUBROUTINE | | JUMP REGISTER | | | | | μPC |
| BRANCH | TRUE | PAGE REGISTER | | JUMP REGISTER | | JUMP REGISTER | |
| BRANCH | FALSE | PAGE REGISTER | | μPC | | μPC | |
| CASE | TRUE | PAGE REGISTER | | JUMP REGISTER + OR MUX | | JUMP REGISTER + OR MUX | |
| CASE | FALSE | PAGE REGISTER | | μPC | | μPC | |
| BRANCH TO SUBROUTINE | TRUE | 0 | | JUMP REGISTER + OR MUX | | JUMP REGISTER + OR MUX | μPC |
| BRANCH TO SUBROUTINE | FALSE | PAGE REGISTER | | μPC | | μPC | |
| TRAP | TRUE | 0 | | JUMP REGISTER + OR MUX | | JUMP REGISTER + OR MUX | μPC-1 |
| TRAP | FALSE | PAGE REGISTER | | μPC | | μPC | |
| RETURN | TRUE | MICROSTACK + OR MUX | | | | | |
| RETURN | FALSE | PAGE REGISTER | | μPC | | μPC | |
| OP-CODE DECODE | TRUE | 0 | | 0 | | OR MUX | μPC-1 |
| OP-CODE DECODE | FALSE | 0 | | DECODE ROM | | μPC | μPC |
| OPERAND SPECIFIER DECODE | IR IS VALID INDIRECT | JUMP REGISTER | | DECODE ROM | | μPC | μPC |
| OPERAND SPECIFIER DECODE | IR IS VALID DIRECT | PAGE REGISTER | | μPC | | μPC | |
| OPERAND SPECIFIER DECODE | IR INVALID | 0 | | 0 | | OR MUX (000) | μPC-1 |
| POWER UP OR PARITY ERROR | | | | | | | |

Fig. 4.

| VALUE OF OR MUX SUB-FIELD | ORMUX3 | ORMUX2 | ORMUX1 | ORMUX0 |
|---|---|---|---|---|
| 0 | 0 | 0 | 0 | 0 |
| 1 | 0 | 0 | 0 | IR INVALID |
| 2 | 0 | 0 | 1 | 0 |
| 3 | MEM ERR | PAGE CROSSING | TB MISS | MODIFY REFUSE |
| 4 | 0 | 0 | BR FALSE | IR INVALID |
| 5 | OVERFLOW | INTERRUPT | CONSOLE HALT | IR INVALID |
| 6 | INDEX <3> | INDEX <2> | INDEX <1> | INDEX <0> |
| 7 | 0 | 0 | SIZE <1> | SIZE <0> |

Fig. 5.

CENTRAL PROCESSING UNIT FOR A DIGITAL COMPUTER

This is a continuation of co-pending application Ser. No. 482,092 filed on Sept. 30, 1985, now abandoned. This is a divisional of the prior application Ser. No. 538,373, filed Oct. 3, 1983, now U.S. Pat. No. 4,586,130, issued Apr. 14, 1988, the benefit of the filing dates of which are hereby claimed under 35 USC 120.

BACKGROUND OF THE INVENTION

A number of digital computers have been developed in recent years with virtual memory management systems, 32 bit data paths, data caches, the ability to use a variety of data types and addressing modes, variable length instruction formats, and other advanced features. To date, however, the result of including such features has been a computer of considerable cost and physical size. For example, it would not be unusual for the central processing unit of a computer having the attributes listed above to occupy 500 square inches of circuit board space. As a consequence, it has been impossible or impractical to use such computers in many applications.

SUMMARY OF THE INVENTION

The present invention provides a central processing unit for a digital computer that is compact and economical, and yet supports a 32 bit data path, variable length instructions, a variety of addressing modes, and other advanced features. The central processing unit utilizes a pipelined, microprogrammed design and includes a number of hardware features that permit implementation of powerful functions with extremely compact microcode.

In one preferred embodiment, the central processing unit of the present invention comprises a plurality of pointer registers which may be used to indirectly address other registers. Each of a plurality of general registers is assigned a register address. During the decoding of macroinstruction that references a particular general register, a pointer register may be loaded with the register address of the general register. When the macroinstruction is executed, the general register is accessed by using the contents of the pointer register as an address to select the general register.

In a second embodiment of the present invention, the central processing unit includes a size register, and means operative during the decoding of a macroinstruction operation code for heading the size register with a code indicating the data size specified in the macroinstruction. During execution of the macroinstruction, the size register may be used at various times to determine the number of elements in the data path.

These and other features of the invention will be apparent from the detailed description and claims to follow, taken in conjunction with the accompanying drawings.

BRIEF DESCRIPTION OF THE DRAWINGS

FIG. 4 is a table illustrating the method for determining the next microaddress by the microsequencer.

FIG. 5 is a table indicating the control signals that may be used to modity the next microaddress.

DETAILED DESCRIPTION OF THE INVENTION

Figure 1:
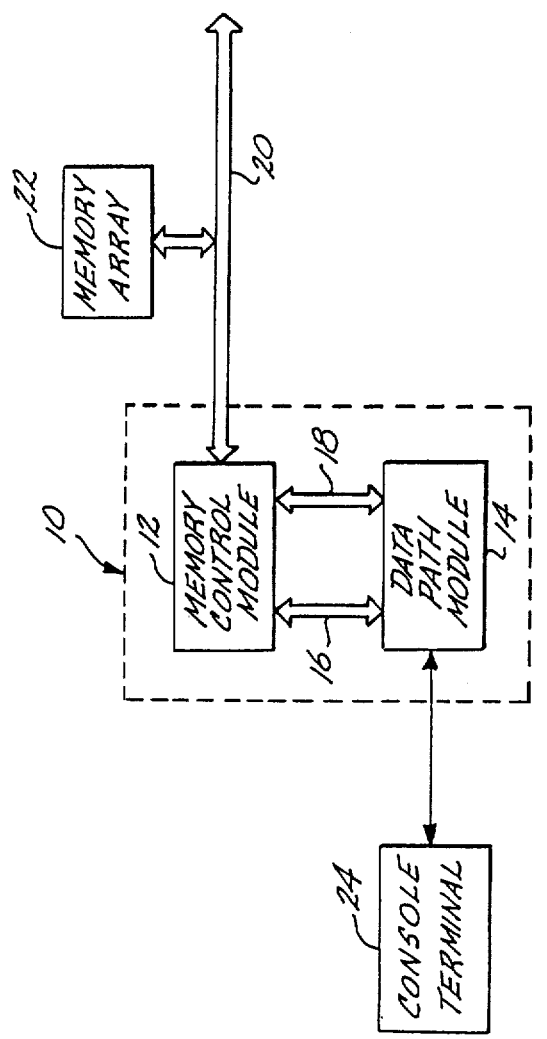
FIG. 1 is a block diagram of a computer system incorporating the central processing unit of the present invention.

FIG. 1 illustrates a computer system which includes a preferred embodiment of the central processing unit of the present invention. The computer system includes central processing unit (CPU) 10, system bus 20, memory array 22, and console terminal 24. The computer system can also include various peripheral devices (not shown) connected to system bus 20, for example disk controllers and network interfaces. Console terminal 24 may be omitted if a suitable interface is provided on bus 20, e.g. an interface to a local area network. CPU 10 consists of memory control module 12 and data path module 14. The actual execution of program instructions is controlled by data path module 14, and memory control module 12 acts generally as an interface between the data path module and the system bus. The memory control and data path modules communicate via memory control bus 16 and memory data bus 18.

Memory control module 12 is a microprogrammed device that operates asynchronously with respect to data path module 14. The memory control module provides an interface between the CPU and the system bus and, in addition, provides address translation, instruction prefetch, and data cache functions for data path module 14. Address translation refers to the translation of virtual addresses specified by data path module 14 into actual physical addresses. The term data cache refers to means for the storage of recently used data in high speed memory arrays within the CPU.

Figure 2:
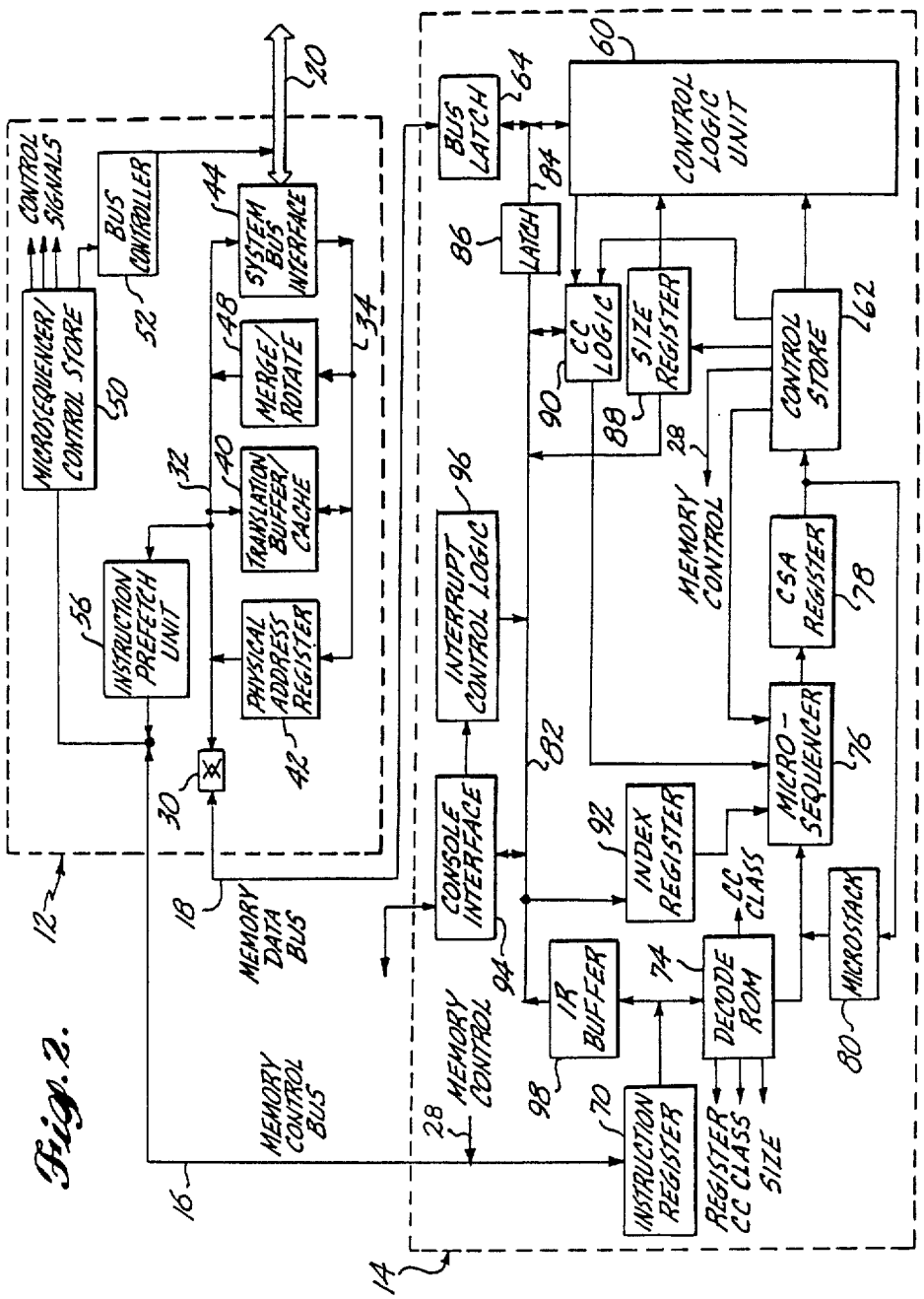
FIG. 2 is a block diagram of one embodiment of a central processing unit of the present invention.

Referring now to FIG. 2, memory control module 12 includes transceiver 30, buses 32 and 34, translation buffer/cache 40, physical address register 42, system bus interface 44, merge/rotate unit 48, microsequencer/control store 50, bus controller 52, and instruction prefetch unit 56. The function of the memory control units will be described by outlining the sequence of operations that takes place when data path module 14 requests that data be read from a specified virtual address. The data path module places the virtual address in but latch 64 from which point it is sent to memory control module 12 over memory data but 18. The address passes through transceiver 30 onto bus 32. The virtual address on bus 32 is presented to translation buffer/cache 40 and if the required translation entry is present (i.e., a cache hit), the corresponding physical address is produced on bus 34. From bus 34, the physical address is loaded into physical address register 42, from which point it is loaded onto bus 32. The physical address on bus 32 is then simultaneously presented to translation buffer/cache 40 and to the system bus interface unit 44. If the required data is in the cache, the translation buffer/cache 40 asserts the requested data onto bus 34 in the next machine cycle. If a cache miss occurs, a system bus cycle is executed to fetch the requested data from memory array 22. When the data is received from memory, it is passed from system bus interface 44 onto bus 34. Once the data from the cache or from memory is received on bus 34, it is loaded through merge/rotate unit 48 back onto bus 32. The requested data is then passed to data path module 14 via transceiver 30 and memory data bus 18, completing the virtual read cycle. The above-described sequence of memory control operations is carried out and coordinated by control signals emanating from microsequencer/control store 50. The particular microprogram executed by microsequencer/control store 50 is selected by memory control command 28 sent by data path module 14 to memory control module 12 over memory control bus 16. This command is asserted at the same time that the virtual address is placed on memory data bus 18. For memory control module microprograms that require the use of system bus 20, the microprograms operate through bus controller unit 52.

An additional function performed by memory control module 12 is the prefetching of instructions for execution by data path module 14. The prefetched instructions are stored in instruction prefetch unit 56, and are passed to data path module 14 as needed, one byte at a time, via memory control bus 16. Memory control bus 16 therefore performs two distinct functions: the transfer of instructions from memory control module 12 to data path module 14, and the transfer of memory control commands from data path module 14 to memory control module 12.

Each macroinstruction executed by data path module 14 generally consists of an operation code (op-code) followed by one or more operand specifiers. The operand specifiers specify either the data or the location of the data upon which the macroinstruction is to operate. In the former case, the data contained within the operand specifier is termed a literal. In the latter case, the operand specifier designates the addressing mode and the number (i.e., address) of a register. Examples of addressing modes are direct, in which the designated register contains the data, and indirect, in which the designated register contains the address of the data. By way of example, in a macroinstruction to add the contents of registers 3 and 4, the op-code would specify addition, and the two operand specifiers would specify register 3 direct and register 4 direct, respectively. In the preferred embodiment described herein, each op-code and operand specifier consists of one or more bytes, and such macroinstruction bytes are received and processed one byte at a time by data path module 14.

Referring now to data path module 14 in FIG. 2, the execution of macroinstructions is carried out by means of microinstructions executed by control logic unit 60. The control logic unit includes the ALU, the general purpose registers, two pointer registers, the macroprogram counter, and other elements as described below. For each macroinstruction, control logic unit 60 executes a series of microinstructions stored in control store 62. The microinstruction sequence commences when the op-code of a new macroinstruction is loaded into instruction register 70 from memory control bus 16. The value of the op-code and a portion of the current microinstruction are used to address a location in decode ROM 74. In response, the decode ROM supplies a number of outputs: a next microaddress, which specifies the address in control store 62 of the first microinstruction corresponding to the macroinstruction op-code; a SIZE signal indicating the length in bytes of the data upon which the macroinstruction is to operate; and a CC CLASS (condition code class) signal whose function is described below. When the instruction register contains an operand specifier, decode ROM 74 in addition supplies a REGISTER signal indicating whether or not the addressing mode is direct.

The next miccroaddress supplied by decode ROM 74 is passed by microsequencer 76 to control store address register 78. The address in control store address register 78 specified the microinstruction which is accessed in control store 62. Portions of the accessed microinstruction are routed to a number of destinations. One portion goes to control logic unit 60 for execution. A second portion goes to microsequencer 76 where it can be used to determine the address of the next microinstruction. In certain situations, control store 62 also supplies memory control signal 28 and values to be loaded into size register 88 and CC logic 90. After the first microinstruction has begun executing, microsequencer 76 causes the address of the next microinstruction to be placed into control store address register 78, and the sequence continues until all microinstructions corresponding to the macroinstruction have been executed. Microstack 80 is included to permit the use of microsubroutines and microtraps in the microprograms in control store 62. The operation of the microstack is described in detail below.

Other elements included in data path module 14 are bus latch 64, buses 82 and 84, latch 86, size register 88, condition code logic 90, index register 92, console interface 94, interrupt control logic 96, and instruction register buffer 98. Buses 82 and 84 are used in a variety of contexts to pass data between data path elements. Latch 86 provides isolation between buses 82 and 84. Size register 88 is used to hold a code, usually derived from the SIZE signal from decode ROM 74 or from control store 62, indicating a default data path width for control logic unit 60. Condition code logic 90 is used to control the setting of macrolevel condition codes based on control logic unit 60 outputs. Index register 92 is a four-bit register that may be used by microsequencer 76 to determine the next microaddress. Console interface 94 is a serial port used to interface the data path module with console terminal 24 (FIG. 1). Interrupt control logic 96 compares any interrupt received from system bus 20 with the current state of the CPU, to determine whether the interrupt should be taken. Instruction register buffer 98 provides a means for sending the contents of instruction register 70 to control logic unit 60 via bus 82.

The function of microsequencer 76 to determine the sequence in which microinstructions are executed by control logic unit 60. It accomplishes this by determining, during the execution of a given microinstruction, the address in control store 62 of the next microinstruction, and placing that address in control store address register 78. The microsequencer determines the next microinstruction address based on information coded into the current microinstruction, and on the signals on various status and control lines.

Figure 3:
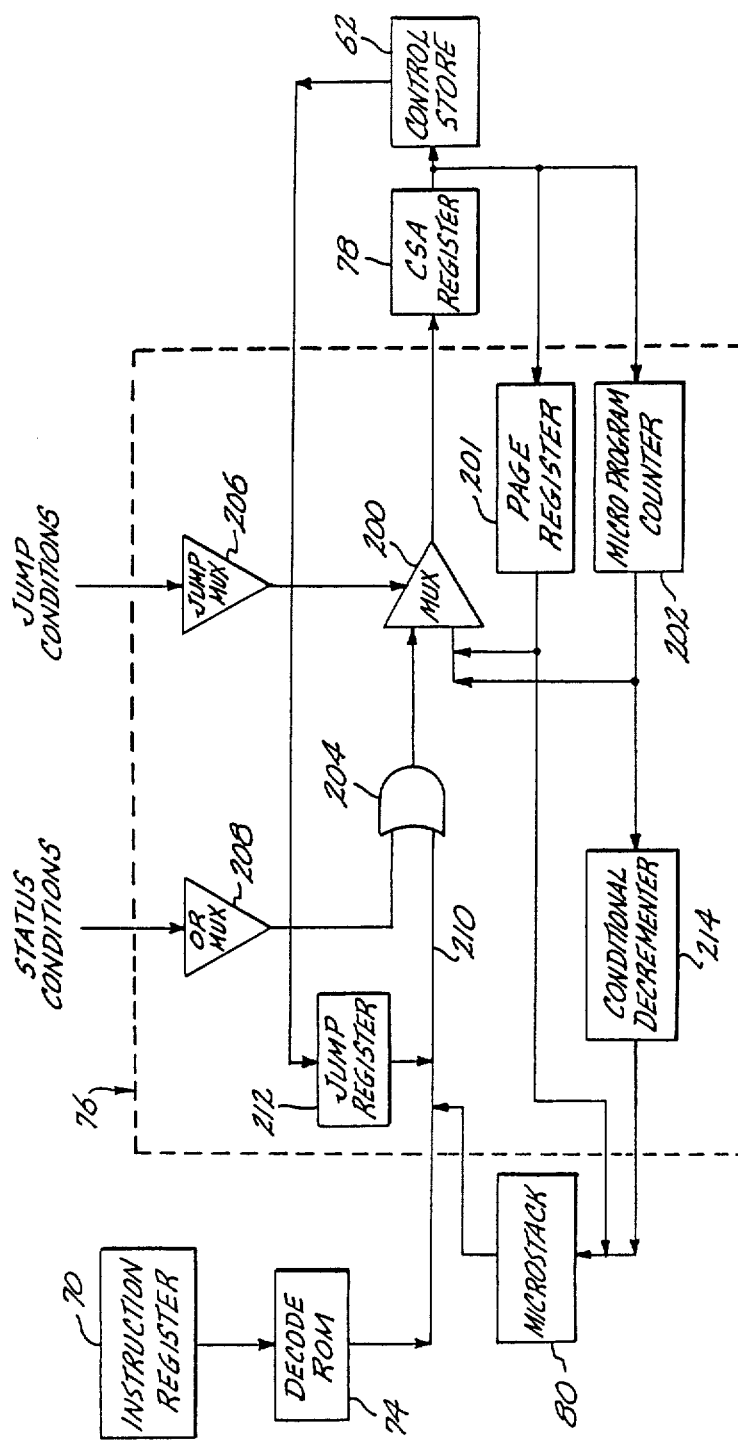
FIG. 3 is a block diagram of a microsequencer for use with the central processing unit of the present invention.

FIG. 3 illustrates microsequencer 76 in greater detail. The next microaddress is determined by the output of MUX (multiplexer) 200. The inputs to MUX 200 are page register 201, microprogram counter 202, and OR gate 204. The selection between these inputs is determined by the output of JUMP MUX 206 and by certain other control signals to be described. Page register 201 contains the high order bits of the current microinstruction address. Microprogram counter 202 contains the low order bits of the current microinstruction address, plus one. Page resiter 201 and microprogram counter 202 therefore together point to the next sequential microinstruction address. The selection of these inputs by MUX 200 represents the simple case in which the computer system executes microinstructions in a sequential fashion.

OR gate 204 performs a logical OR operation between the output of OR MUX 208 and the address on bus 210. Bus 210 contains an address determined either by decode ROM 74, jump register 212, or microstack 80. The bus 210 address is derived from decode ROM 74 when a macroinstruction op-code or operand specifier byte is being decoded. In this case, the decode ROM provides either all or part of the address of the first microinstruction required to carry out the function specified by this macroinstruction byte. In general, jump register 212 is the source of the address on bus 210 when a nonsequential jump or branch is to be taken in the microinstruction sequence. The address to which the branch is to be taken is derived from the contents of the current microinstruction in control store 62 and placed in jump register 212. Finally, microstack 80 is the source of the address on bus 210 when a return from a microsubroutine or microtrap is to be taken. The return address is stored in microstack 80 when the original subroutine call or trap is taken. The return address is determined either by the contents of page register 201 and microprogram counter 202 for a subroutine call, or by the contents of the page register and the microprogram counter less one (i.e., the current microaddress) for a trap. In the latter case, conditional decrementer 214 is used to subtract one from the contents of microprogram counter 202.

Each microinstruction stored in control store 62 include three fields: a data path control field, a condition code/size field, and a next address control field. The data path control field is used to control the execution of the microinstruction by control logic unit 60 (FIG. 2). The condition code/size field is discussed below. The next address control field is used by microsequencer 76 to determine the address of the next microinstruction. The next address control field can conceptually be broken down into four subfields as follows:

Type
Jump Condition
OR
JUMP ADDRESS

The Type subfield specifies one of the branch types listed in FIG. 4 and explained more fully below. The Jump Condition subfield specifies the condition to be tested to determine whether or not a nonsequential branch is to be taken in the microinstruction sequence. Referring to FIG. 3, the Jump Condition subfield in part determines which of the inputs of JUMP MUX 206 is selected for controlling MUX 200. Typical Jump Conditions which may be selected are the ALU condition codes, whether or not an interrupt or console halt has been received, whether or not the outputs of OR MUX 208 are zero, and whether the signal IR INVALID has been asserted. The IR INVALID signal is generated by instruction prefetch unit 56 whenever instruction register 70 does not contain valid information. In general, if the selected condition is true, then MUX 200 selects the address supplied by OR gate 204 and the branch is taken. If the condition is not true, MUX 200 selects the next sequential address supplied by page register 201 and microprogram counter 202.

The OR operation performed by OR gate 204 only operates on the less significant bits of the address on bus 210. In a preferred embodiment of the present computer system, the output of OR MUX 208 is four bits wide, and, for certain microinstruction branch types, these four bits are ORed with the low order four bits on bus 210. The OR MUX is thus capable of providing multidestination branching (i.e., casing). The output of OR MUX 208 is controlled by the OR subfield of the current microinstruction. FIG. 5 shows one preferred embodiment of the present invention in which the OR subfield is up to three bits wide and capable of selecting from up to eight sets of four bit inputs. For each selection, corresponding to OR subfield values zero through seven, FIG. 5 lists the values for each of the OR MUX output bits ORMUX3 through ORMUX0. For a subfield value of zero, all OR MUX outputs are zero. For a value of one, ORMUX0 is set to one if the IR INVALID signal is asserted. For a value of two, ORMUX1 is set to one. This value may conveniently be used to provide multiple returns from microsubroutines. For a value of three, the OR MUX output is determined by the signals on four memory control status lines as indicated. MEM ERR refers to a miscellaneous error signal from memory control module 12. PAGE CROSSING indicates an attempt to access data that crosses a 512 byte page boundary. TB MISS indicates that a translation entry for a requested virtual address was not found in translation buffer/cache 40. MODIFY REFUSE indicates that a memory write operation could not be performed because the modify bit in the corresponding translation buffer entry was not set. For a code value of four, the OR MUX output is determined by the IR INVALID signal and by BR FALSE, the latter indicating whether a macrolevel branch will be taken. For a code value of five, the OR MUX output is determined by the indicated status signals. OVERFLOW refers to the PSL V code described below. INTERRUPT and CONSOLE HALT refer to signals from interrupt control logic 96 and console interface 94, respectively. For a code value of six, the OR MUX output is equal to the contents of index register 92 (FIG. 2). For a code value of seven, the OR MUX output is determined by the contents of size register 88.

FIG. 4 summarizes the methods by which microsequencer 76 selects the next microaddress. The Type subfield of the current microinstruction specifies one of the branch types listed in the first column of FIG. 4. The operation of these types is described in the following paragraphs. In FIG. 4, the symbol $\mu$ PC stands for microprogram counter 202.

When the branch type is Jump or Jump to Subroutine, the address contained in the Jump Address subfield of the current microinstruction is loaded into Jump Register 212. This address is enabled onto bus 210, from which point it passes without modification through OR gate 204 and MUX 200. The next microaddress is therefore determined entirely by the Jump Address subfield of the current microinstruction. Jump and Jump to Subroutine branch types are used to cause unconditional branches in microinstruction flow. When a Jump to Subroutine is executed, the contents of page register 201 and microprogram counter 202 are pushed onto microstack 80.

A branch type of Branch is used to perform a conditional Jump to a microaddress within the current page. As indicated in FIG. 4, the high order five bits of the next microaddress are determined by page register 201, and the low order eight bits are determined based on the Jump Condition. If the Jump Condition is true, the low order bits are derived from the low-order Jump Address subfield of the current microinstruction via Jump Register 212. If the Jump Condition is false, no jump is taken, and the low order bits are derived from microprogram counter 202. The Jump Condition is equal to the signal selected by Jump MUX 206 based upon the Jump Condition subfield of the current microinstruction.

The Case branch type is similar to Branch, except that if the Jump Condition is true, the low order bits of the next microaddress are determined by the Jump Register in combination with the OR MUX output. In particular, the four OR MUX output bits (FIG. 5) are ORed with the low order four bits of the Jump Register by OR gate 204.

The Branch to Subroutine and Trap branch types are similar to Case, except that if the Jump Condition is true, the high order bits of the next microaddress are forced to zero, and either the next sequential microaddress (Branch to Subroutine) or the current microaddress (Trap) are pushed onto microstack 80.

The Return branch type is used to return to any microaddress which has been pushed onto microstatck 80. The Return branch type is conditional, and will only return if the Jump Condition is true. A false Jump Condition will cause the next sequential microaddress to be selected by microsequencer 76.

FIG. 4 also illustrates the way that the next microaddress is determined when control logic unit 60 executes a microinstruction which calls for the decoding of an op-code or an operand specifier in instruction register 70. For an op-code decode, the next microaddress is determined by the address supplied by decode ROM 74 if the specified Jump Condition is false. In this event, the high order bit of the next microaddress is set to zero. However, if the specified Jump Condition is true, then the next microaddress is determined entirely by the four bit output of OR MUX 208, and the current microaddress is pushed onto microstack 80. In general, the Jump Condition specified in an op-code decode microinstruction will be the IR INVALID signal. As a result, when data path module 14 attempts to decode an op-code which is not yet available in instruction register 70, a trap is taken to a low microaddress where a subroutine waits for instruction prefetch unit 56 to catch up.

When an operand specifier decode microinstruction is executed, the next microaddress is determined by two signal: the IR INVALID signal and the REGISTER signal supplied by decode ROM 74, the latter indicating whether the addressing mode of the operand specifier is direct. If the instruction register is valid and the mode is direct, then the next sequential microaddress is selected. If the instruction register is valid and the mode is indirect, then the microprogram jumps to a subroutine at an address whose high order portion is determined by the high-order bits of Jump Register 212, and whose low order portion is equal to the microaddress supplied by decode ROM 74. The address in Jump Register 212 is derived from Jump Address subfield of the current microinstruction. Finally, if the IR INVALID signal is asserted, then the microprogram traps to a subroutine whose address is specified by the output of OR MUX 208, which in this case is set to a value equal to one.

The last situation illustrated in FIG. 4 is power-up or a parity error. In this case, data path module 14 begins executing microinstructions at address zero.

Figure 6:
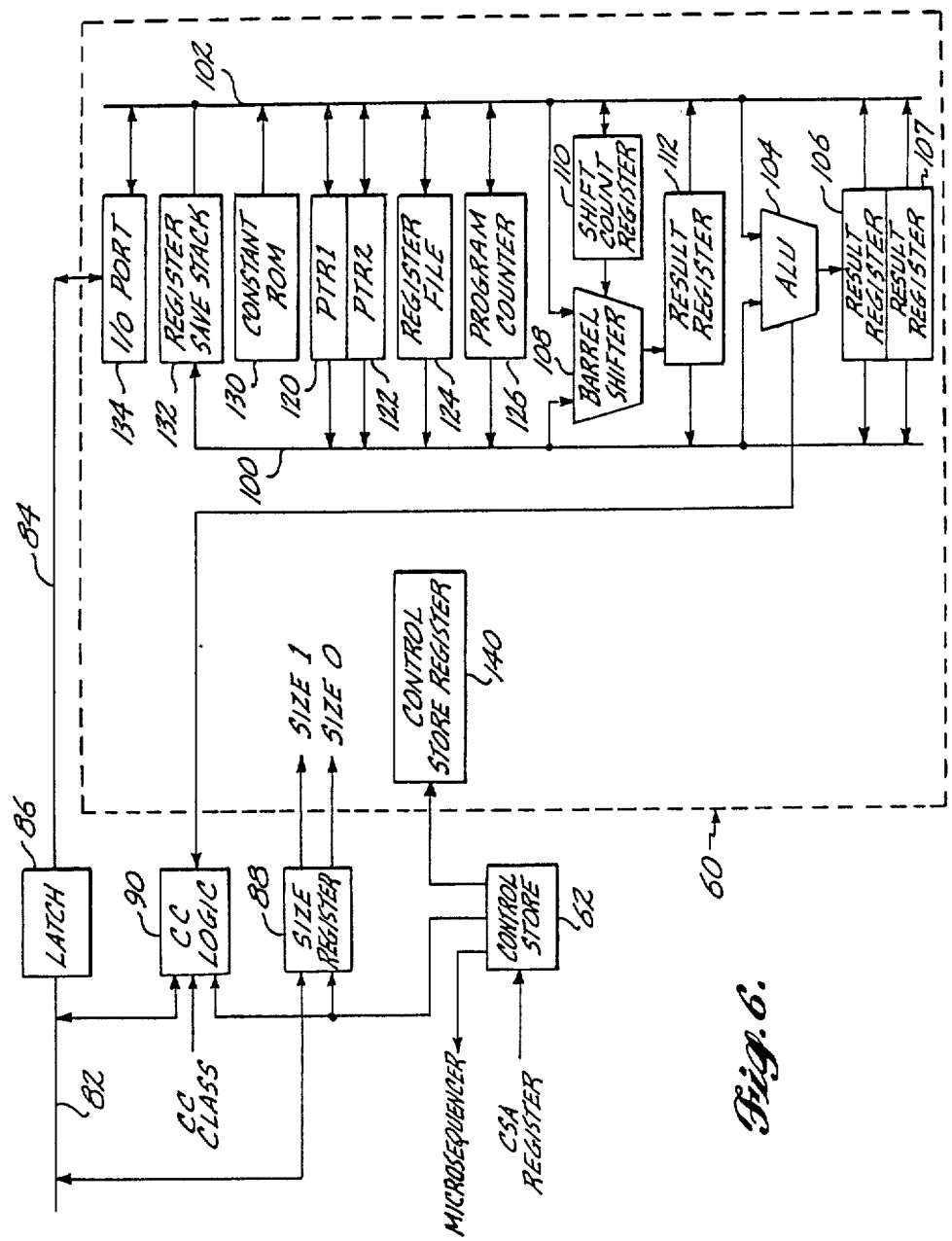
FIG. 6 is a block diagram detailing the control logic unit of the central processing unit of the present invention.

FIG. 6 illustrates control logic unit 60 in greater detail. The control logic unit includes buses 100 and 102, ALU 104, result registers 106 and 107, barrel shifter 108 and associated shift count register 110 and result register 112, pointer registers 120 and 122, register file 124, program counter 126, constant ROM 130, register save stack 132, I/O port 134, and control store register 140.

The execution of a microinstruction by control logic unit 60 commences when the data path control field of the microinstruction is loaded into control store register 140 from control store 62. In general, the data path control field includes a micro op-code and two micro operand specifiers. When the micro op-code specifies an arithmetic or logic operation (e.g., Add, And, Mask, Compare), the operation is carried out by ALU 104. The two required operands are supplied via buses 100 and 102, and the result of the operation is placed in result register 106 or 107, depending on a bit contained within the current microinstruction.

Barrel shifter 108 is used for shift operations. The shift count may be stored in shift count register 110 or supplied as a literal in the microinstruction. The result of the shift operation is stored in result register 112.

Register file 124 contains a number of general registers accessible to the macrolevel program, plus both general and special purpose microlevel registers. The term general register will hereafter be used to refer to both macrolevel and microlevel general purpose registers in register file 124. Each register may be read from either bus 100 or 102, but may be written only from bus 102. Each register in register file 124 has a unique register address associated with it, the register address being used as described below to specify the register during microinstruction execution.

Size register 88 is used to control the width of the data path utilized by control logic unit 60, and to control microprogram branching as indicated in FIG. 5. In a preferred embodiment of the present computer system, the data path can be up to 32 bits wide, although particular macroinstructions may specify a smaller data path such as byte (eight bits) and word (16 bits). For example, a macroinstruction might specify that a byte is to be retrieved from a particular virtual memory address and loaded into general register 3 (i.e., the general register in register file 124 having a register address of 3). This macroinstruction would affect only the low order eight bits of general register 3, leaving the high order 24 bits unaffected. A full 32-bit block of data is referred to as a longword.

Size register 88 is loaded with a two-bit code directly from decode ROM 74 when a macroinstruction op-code is decoded. In one preferred embodiment, the coding scheme is:
0-byte
1-word
2-not used
3-longword Thus the data path width specified by an op-code can be made available to the control logic unit (as signals SIZE0 and SIZE1) during the entire execution sequence for that op-code, without the use of ALU operations for masking, and without any moving, rotating, or refreshing of the register.

The contents of the size register can be altered when a microinstruction for performing an operand specifier decode is executed. When such a microinstruction is executed, the condition code/size field of the microinstruction is loaded from control store 62 into size register 88 if the value of the field is zero (byte), 1 (word), or 3 (longword). If the value is 2, then the size register 88 is unaffected, leaving intact the size specified by the preceding op-code.

Aside from decode microinstructions, the size register can be modified only by Move microinstructions that explicitly specify the size register as their destination operands. Microinstructions other than decodes can, however, control the data path width during their execution by means of their condition code/size field. For ALU and shift microinstructions, the condition code/size coding is discussed below. For other microinstructions, (e.g., Move, Memory Request), the condition code/size field coding is as follows:

0-byte
1-word
2-use size register
3-longword

Thus a given microinstruction can either specify its own data path width, or can specify the size register and therefore use the width specified by a preceding op-code or operand specifier. The result is that the efficiency gained by the use of size register 88 does not cause any corresponding loss of flexibility in the microporgramming of the present computer system.

Pointer registers 120 and 122 are six-bit registers that can reach serve two functions: they can contain the address of (i.e., point to) a particular general register in register file 124, or they can contain a literal value derived from an operand specifier. Pointer registers 120 and 122 can be read from buses 100 and 102, and written from bus 102. The use of two pointer registers provides significant advantages in the execution speed of many macroinstructions. For example, a macroinstruction to add the contents of general registers R1 and R2, placing the result in general register R2, might by coded as follows:

Op-code-Add
Operand specifier 1-R1, direct mode
Operand specifier 2-R2, direct mode with each operand specifier including a mode field specifying the addresser, mode and either a register field containers the address of a register (as above) or a literal. Without the use of the pointer registers of the present invention, the microinstruction sequence for this macroinstruction would require seven steps as follows:

1. Decode op-code
2. Decode operand specifier 1
3. More R1 to TEMP1
4. Decode operand specifier 2
5. More R2 to TEMP2
6. Add TEMP3=TEMP1+TEMP2
7. Move TEMP3 to R2 where TEMP1, TEMP2 and TEMP3 stand for general microlevel registers. The use of two pointer registers reduces the required number of steps to five, as follows:

1. Decode op-code
2. Decode operand specifier 1, place address of R1 of PTR1
3. Decode operand specifier 2, place address of R2 in PTR2
4. Add TEMP1=@PTR1+@PTR2
5. Move TEMP1 to @PTR2 where the symbol @ X signifies the location (i.e., register) whose address is in register X, and where PTR1 and PTR2 specify pointer registers 120 and 122. As indicated in steps 2 and 3 above, an operand specifier decode causes one of the pointer registers 120 or 122 to be loaded with the number of the register specified by the operand specifier. This loading of a pointer register takes place regardless of the addressing mode specified by the operand specifier. In the case of an operand specifier containing a literal, the literal is likewise loaded into a pointer register. In all cases, a bit in the microinstruction for performing the operand specifier decode determines which pointer register (120 or 122) is loaded. Referring to FIG. 2, the pointer registers are loaded from instruction register 70 through instruction register buffer 98, bus 82, latch 86, bus 84, I/O port 134 and bus 102.

The Add and Move microinstructions in steps 4 and 5 of the second example above indirectly registers R1 and R2 through the use of pointer registers 120 and 122. To implement such an addressing method, two register addresses are assigned to each of the pointer registers, a direct address and an indirect address. The direct address of a pointer register is fully analogous to the address of the registers in register file 124, and is used to specify the contents of that register. For example, for a microinstruction such as Move 3, 4 in which the first and second micro operand specifiers specify the registers in register file 124 whose addresses are 3 and 4 resepctively, the result would be that the contents of register 3 would be moved to register 4. Pointer registers 120 and 122 provide a different and generally more efficient method of accomplishing the same result. Each pointer register is assigned a unique indirect address different from the direct address of any register. When the indirect address is specified by a micro operand specifier, the register actually accessed is determined by the contents of the indirectly addressed pointer register. For example, if pointer registers 120 and 122 were assigned indirect addresses of 54 and 55, and contained the numbers 3 and 4, then the microinstruction Move 54,55 would be equivalent to Move 3, 4.

Program counter 126 is a register which stores the address of the next macroinstruction byte to be executed. As with pointer registers 120 and 122 and the registers in register file 124, program counter 126 may be read from either bus 100 or 102, and may be written from bus 102. Program counter 126 is automatically incremented, 1, 2 or 4, when one of the following occurs:

(1) An op-code decode microinstruction is executed.
(2) An operand specifier decode microinstruction is executed.
(3) The current microinstruction specifies instruction register 70 as the location of one of the microinstruction operands.
(4) A microinstruction is executed which specifies retrieval of data from the macroinstruction instruction stream.

Cases (1) and (2) have already been described. Program counter 126 is incremented by one whenever a new macroinstruction byte is clocked out of the instruction register 70, such that the address in program counter 126 corresponds to the virtual address of the new macroinstruction byte. An example of case (3) is a situation in which a byte in the macroinstruction stream contains literal data. For example, one type of operand specifier specifies the address of the operand by specifying a register which contains a base address, and a fixed offset to be added to the base address found in the register. In this situation, the operand specifier would consist of two bytes, the first byte specifying the register address (e.g., register 2) and the addressing mode, and the second byte containing the fixed offset (i.e., a literal). The microinstructions for accessing such an operand would begin by decoding the first operand specifier byte and putting the value 2 (the register address) in pointer register 120. The following microinstruction would then Add the value pointed to by pointer register 120 to the literal contained in instruction register 70. The microinstruction would reference instruction register 70 by specifying a unique register address assigned to the instruction register. The literal would reach ALU 104 from instruction register 70 through instruction register buffer 98, bus 82, latch 86, bus 84, I/O port 134 and bus 102. The execution of the Add microinstruction specifying the address of instruction register 70 as an operand causes program counter 126 to be incremented by 1.

Case (4) listed above is termed an instruction stream memory request. When such a microinstruction is executed, control signals are sent from control store 62 to memory control module 12 via memory control bus 16. At the same time, the unincremented contents of program counter 126 are driven onto bus 84 via bus 102 and I/O port 134, and from there sent to memory control module 12 via memory data bus 18. Proram counter 126 is then incremented by 1, 2 or 4, depending upon whether the instruction stream memory request microinstruction specified a byte, word or a longword. On memory control module 12 (FIG. 2), instruction prefetch unit 56 maintains a prefetch buffer filled with macroinstruction stream bytes. An instruction stream memory request first clears the prefetch buffer, then reads a byte, word, or longword from translation buffer/cache 40 or memory array 22 and sends the resulting data to data path module 14 via memory data bus 18. Instruction prefetch unit 56 then refills the prefetch buffers beginning with the next byte in the macroinstruction stream following the bytes sent to data path module 14.

Register save stack 132 is a LIFO stack used to temporarily store the contents of specified registers. Each entry on the stack consists of the contents of a register plus the address (number) of that register. An example illustrating the use of the register save stack is the decoding of an operand specifier that specifies an autoincrement addressing mode. In such a mode, the contents of a specified register is first used as an address to access the operand, and the register is then automatically incremented by 1, 2 or 4. When an autoincrement mode operand specifier is decoded, the unincremented contents of the register are automatically pushed onto the register save stack. If the attempted memory access then results in an error condition, the register can be restored to its preexisting condition by popping the stack. The push operation is controlled by the current microinstruction, which contains a bit that determines whether or not a push will occur. If a push is to occur, one of the micro operand specifiers contains the address of the register.

Condition code logic unit 90 is used for storing and controlling two sets of condition codes: microprogram level (ALU) condition codes and macroprogram level (PSL) conditionn codes. Four conditions are provided at each level:
N-negtive
Z-zero
V-overflow
C-carry The ALU condition codes reflect the result of the last microinstruction executed by control logic unit 60, which specified in the condition code/size field that the ALU condition codes were to be loaded, and comprise four of the inputs to JUMP MUX 206 (FIG. 3). The ALU condition codes can therefore be used as jump control signals by microinstructions, as indicated in FIG. 4. The PSL condition codes are the condition codes available to the macroprogram level, and may be used by the macroprogram to determine whether a macrobranch should be taken.

When an op-code is decoded by decode ROM 74, a two-bit Condition Code Class signal is produced and sent directly to a condition code class register (not shown) contained within condition code logic unit 90. The contents of the condition code class register determine how the ALU codes are mapped to the PSL codes as follows:

| Condition Code Class Register | Class | |
|---|---|---|
| 0 | Logical | ALU N to PSL N |
| | | ALU Z to PSL Z |
| | | ALU V to PSL V |
| | | PSL C to PSL C |
| 1 | Arithmetic | ALU N to PSL N |
| | | ALU Z to PSL Z |
| | | ALU V to PSL V |
| | | ALU C to PSL C |
| 2 | Compare | ALU N to PSL N |
| | | ALU Z to PSL Z |
| | | Clear PSL V |
| | | ALU C to PSL C |
| 3 | Floating Point | ALU N to PSL N |
| | | ALU Z to PSL Z |
| | | ALU V to PSL V |
| | | Clear PSL C |

The actual setting of condition codes by a given microinstruction is determined by the condition code/size field of that microinstruction. As described above, certain types of microinstructions (e.g., Move, Memory, Request, Decode) use the condition code/size field to specify data path width, and for these microinstructions, the condition codes are never set. For other microinstructions (e.g., Add, And, Shift) the condition code/size field controls data path width and condition code setting as follows:

| Condition Code/ Size Field Value | Data Path Width | |
|---|---|---|
| 0 | longword | condition codes not affected |
| 1 | longword | set ALU condition codes |
| 2 | longword | set ALU & PSL condition codes |
| 3 | per size register | set ALU & PSL condition codes |

For such microinstructions, the contents of the condition code/size field is sent directly to the CC logic unit 90 from control store 62.

We claim:

1. A central processing unit for a computer for decoding and executing macroinstructions comprising an operation code and first and second operand specifiers, wherein each operand specifier includes a register field and a mode field for specifying literal operands or direct or indirect addressing modes, each macroinstruction being executed by executing a series of microinstructions corresponding to said macroinstruction op-code, and including a micro op-code and first and second micro-operand specifiers having register and mode fields, said central processing unit comprising:
- a plurality of general registers for the temporary storage of data representing operands or location of operands, each general register having a unique address associated therewith;
- at least two pointer registers for the temporary storage of data, including data specifying the address of a general register and data representing the literal value of an operand, each pointer register having assigned to it (i) a direct address specifying as an operand the contents of the general register addressed in the register field of one of said micro-operand specifiers and (ii) a unique indirect address specifying as an operand address the contents of the general register addressed in the register field of said micro-operand;
- decoding means for decoding the macroinstruction and for loading the register fields thereof, without alteration, into respective pointer registers; and
- execution means for executing the macroinstruction by executing said corresponding series of microinstructions, the execution means including an ALU having first and second input ports, and register access means for providing data specified by a first pointer register to said first input port and for providing data specified by a second pointer register to said second input port.

2. The central processing unit of claim 1, wherein the decode means loads the register fields of the operand specifies into the respective pointer registers regardless of the addressing mode specified by the operand, specifies, and regardless of whether or not the operand specifiers contain a literal.

3. The central processing unit of claim 1, wherein the decode means includes means for decoding an operand specifier in response to an operand specifier decode microinstruction associated with a prior macroinstruction, and wherein the decode means, for each operand specifier decoded, loads the register field of the operand specifier into the pointer register designated by flag data contained within the operand specifier decode microinstruction.

4. A method for executing macroinstructions in a central processing unit, via arithmetic logic unit (ALU) means having first and second input ports, said macroinstructions comprising a macroinstruction operation code (op-code) and first and second operand specifiers each including a register field and a mode field for specifying literal operands or direct or indirect addressing modes, each macroinstruction being executed by executing a series of microinstructions corresponding to the macroinstruction operation code, each microinstruction including a micro operation code and first and second micro-operand specifiers having register and mode fields, said method comprising the steps of:
- temporarily storing macroinstruction data representing operands or location or operands in one or more general registers each having a unique address associated therewith;
- loading the register fields accompanying a macroinstruction, without alteration, directly into corresponding ones of a plurality of pointer registers, each pointer register adapted to temporarily storing macroinstruction data and having assigned to it (i) a direct address specifying as an operand the contents of the general register addressed in the register field of one of said micro-operand specifiers and (ii) a unique indirect address specifying as an operand address the contents of the general register addressed in the register field of said micro-operand;
- specifying the pointer register data as the literal value of an operand when said mode field in said decoded macroinstruction specifies a literal operand;
- designating the pointer register data as a direct address when said decoded mode field specifies a direct addressing mode;
- designating the pointer register data as an indirect address when said decoded mode field specifies an indirect addressing mode;
- providing data specified by the first pointer register to said first input port of said ALU;
- providing data specified by the second pointer register to said second input port of said ALU; and
- executing said macroinstruction by executing said corresponding series of microinstructions by using as operands data provided by said first and second pointer registers to said ALU ports.

5. The method for executing instructions as set forth in claim 4 wherein the register fields are loaded into respective pointer registers regardless of the addressing mode specified by the operand specifier, and regardless of whether or not the operand specifier contains a literal.

* * * * *